Patented Feb. 14, 1928.

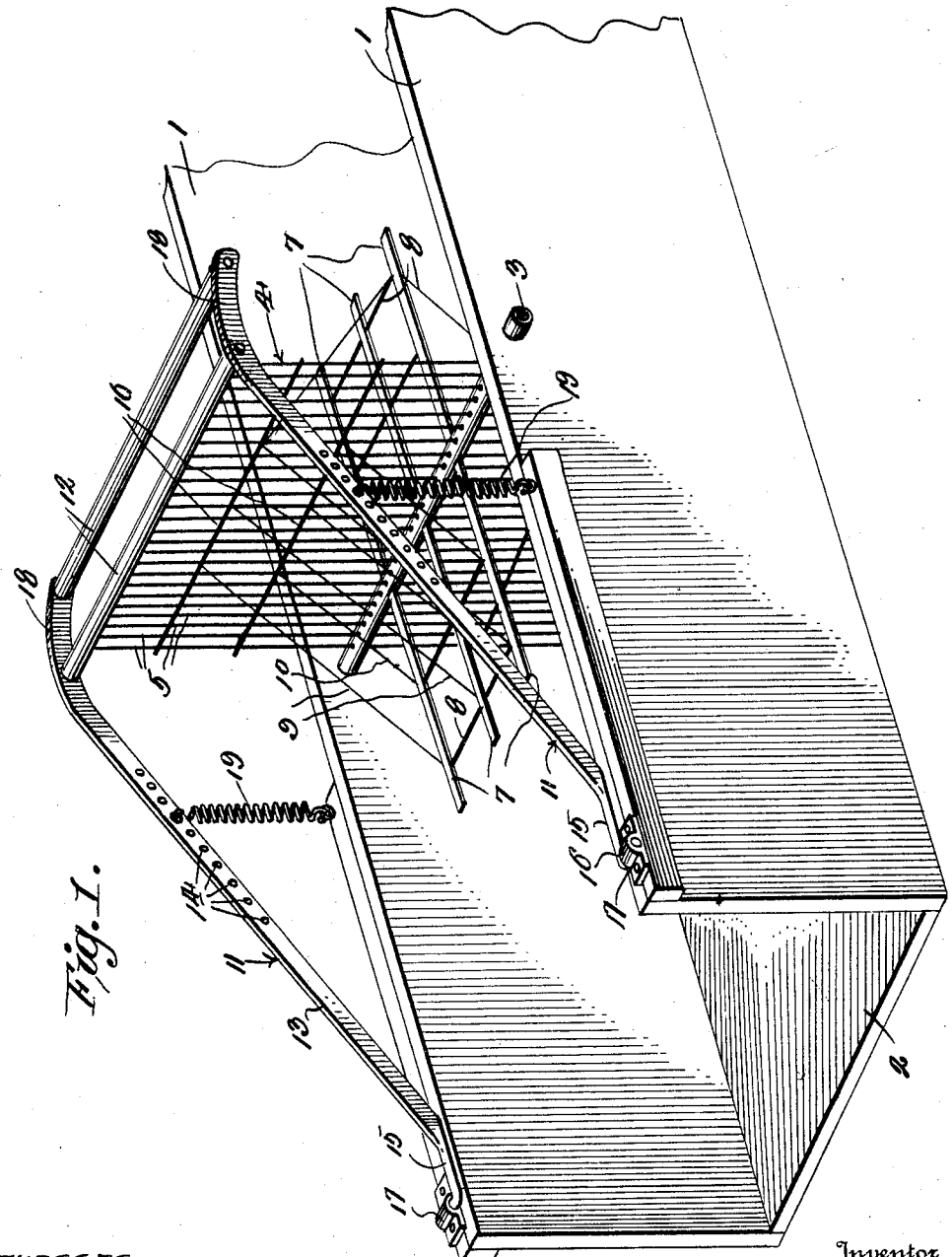

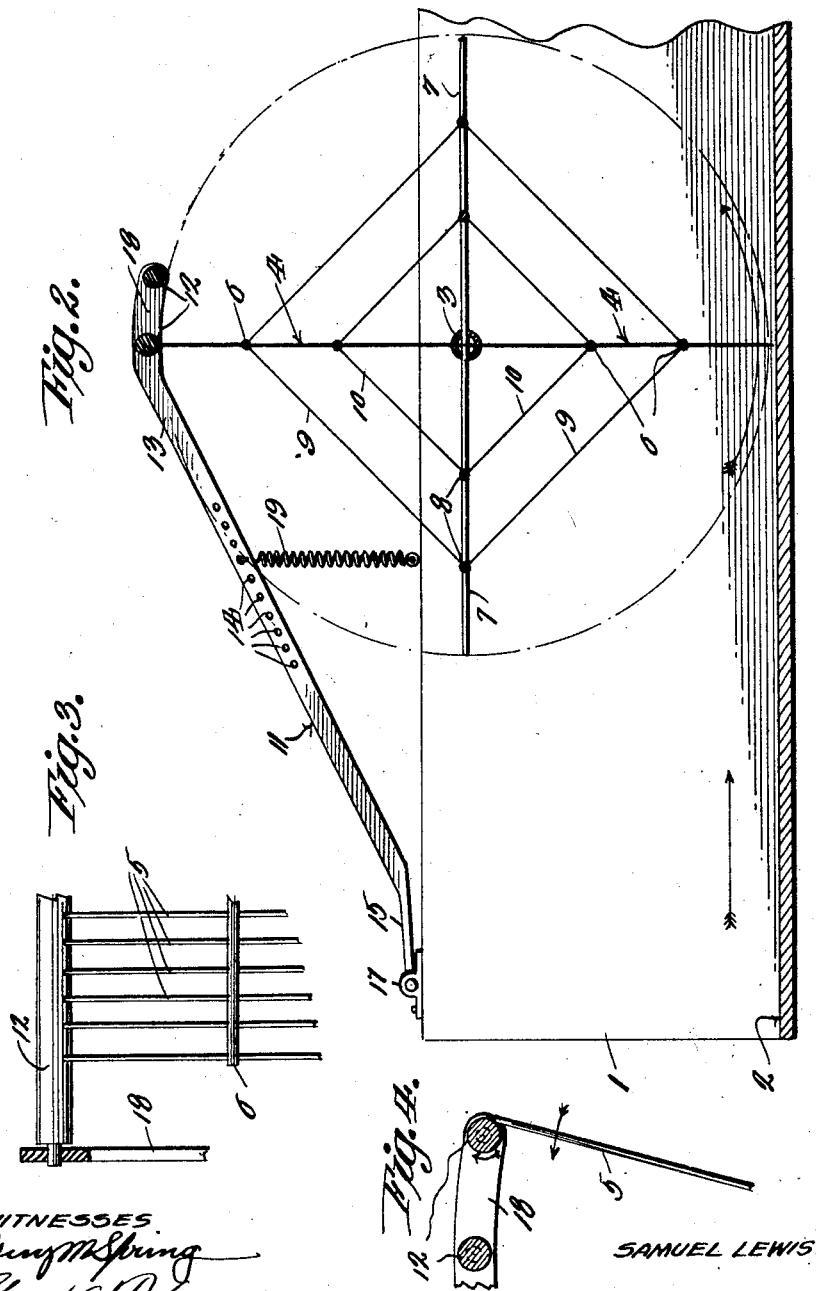

1,658,875

UNITED STATES PATENT OFFICE.

SAMUEL LEWIS ARNOLD, OF BOULDER, MONTANA.

FISH-STOP SCREEN.

Application filed February 14, 1927. Serial No. 168,198.

This invention relates to a fish-stop screen for use in irrigation ditches or canals.

This invention has for its primary object the provision, in a manner as hereinafter set forth, of a fish stop designed to be employed in irrigation canals, which will effectively stop the passage of fish into the canals and at the same time will not become clogged with leaves and other matter carried by the water into the irrigation ditches.

Another object of the invention is to provide, in a manner as hereinafter set forth, a fish stop screen which will automatically release any leaves or rubbish which might gather against the face of the screen, so that the screen will not in any way interfere with the flow of water through the canal to the ditches.

A still further and final object of the invention is to provide, in a manner as hereinafter set forth, a fish stop screen for irrigation canals, which will be strong and durable, efficient in action, comparatively inexpensive to manufacture and easily installed.

Other objects and advantages of the invention will become apparent as the description of the same proceeds, and the invention will be best understood from a consideration of the following detailed description, taken in connection with the accompanying drawings, forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 shows the screen structure embodying this invention, in perspective, as set up in a canal.

Figure 2 is a transverse sectional view of the screen, the section being taken longitudinally of the canal.

Figure 3 is an enlarged detailed view of a portion of the screen and a stop bar which holds the same in position.

Figure 4 is an enlarged detailed view taken transversely of the roller and stop bars showing the manner in which the same operate to check the revolution of the screen.

Referring now to the drawings in detail wherein like numerals of reference indicate corresponding parts throughout the several views, the numerals 1 and 2 indicate the side and bottom planking respectively of a head gate.

Mounted between the side walls 1, is a revolvable shaft 3 from diametrically opposite sides of which there extends the screens indicated generally by the numerals 4. These screens are made up of a plurality of wires 5 which extend through the shaft 3 extending from the opposite sides thereof in the manner shown. These screens 4 extend throughout the length of the shaft or the width of the canal in which the device is placed. Cross connecting brace rods 6 extend transversely of the screen wires 5, to prevent wires from spreading.

Extending at right angles to the screens 4 from diametrically opposite points on the shaft 3, are the spaced paddle rods 7, these rods being preferably extended through the shaft as shown in Figure 2 to extend an equal distance upon each side with the flat faces thereof extending transversely of the length of the canal. Cross connecting rods 8 extend between the paddle rods 7 for maintaining the same in the proper spaced relation.

Extending from a point adjacent the outer end of each of the paddle arms or rods 7 is a brace wire 8 which connects with the outermost one of the brace rods 6 of each of the screens 4. Other brace wires extend from the paddle rods 7 inwardly of the connecting points of the wires 9 to the inner ones of the cross connecting rods 6 of each of the screens as indicated by the numerals 10.

Overlying the canal and the revoluble screen structure described is a screen retaining frame comprising the side rails each indicated generally by the numerals 11, and the roller elements 12 extending between the side rails as hereinafter explained.

Each of the side rails 11 comprises an elongated intermediate portion 13 having a plurality of apertures 14 formed therethrough, intermediate the ends thereof and each having one end extended at an obtuse angle and formed in circular cross section as indicated at 15, each of the angled ends of the side rails being turned outwardly to set up hinge engaging fingers 16. Each of the fingers 16 is pivotally mounted in a bearing structure 17 secured to the top edge of an adjacent side plank 1, thus arranging the rails 11 longitudinally of each side of the canal. The forward ends of the rails 11 are slightly curved downwardly as indicated at 18 and these curved ends overlie the screen structure as shown. The rollers 12 connect between the curved portions of the side rail, one roller being connected adjacent the outer ends of the rail while the inner roller is mounted between the rails to lie directly over the shaft 3.

A coil spring 19 extends from each of the side rails 11 downwardly to and is attached to the adjacent side plank 1 of the canal in the manner shown, the upper ends of the coil being engaged to one of the apertures 14 of the side rail.

These springs 19 tend to draw the screen retaining frame downwardly so that the inner one of the roller members 12 will engage across the outer edge of one of the screens 4 to maintain the opposite or lower screen in position cross ways of the canal to prevent fish from passing therethrough.

During the passage of water through the canal, it will be of course understood that considerable débris will collect against the screen and when a sufficient amount has collected, the pressure of the water thereagainst will cause the screen to swing so that the upper screen will ride beneath the roller engaging it and the entire structure will revolve, allowing the accumulated matter to pass through the canal. The paddle arms 7 will thus be brought down into the water of the canal and will be actuated thereby to cause the screen structure to perform a complete half revolution, the upwardly swinging screen 4 contacting with the outer roller 12 which acts to break or retard its movement. The force of the impact between the free end of the swinging screen and the first one of rollers 12 will cause the free end of the frame 11 to swing upwardly a sufficient distance to permit the said upper spring to pass beneath this first roller. The frame 11 will be immediately drawn downwardly by the springs 19 bringing the second one of the rollers 12 in the path of the free edge of the screen to stop the same, the momentum of the screen having been checked sufficiently by the impact with the first one of the rollers to prevent it from again forcing the frame upwardly and passing the second roller.

Having thus described my invention, what I claim is:

1. In an irrigation canal fish screen structure, a revoluble shaft mounted transversely of the canal, diametrically oppositely directed screen structures mounted upon said shaft adapted to alternately position in said canal, and diametrically oppositely directed paddle arms carried by said shaft at right angles to said screen structure for causing said shaft to describe a complete half revolution under certain conditions.

2. In an irrigation canal fish screen structure, a revoluble shaft mounted transversely of the canal, diametrically oppositely directed screen structures mounted upon said shaft adapted to alternately position in said canal, and diametrically oppositely directed paddle arms carried by said shaft at right angles to said screen structure for causing said shaft to describe a complete half revolution under certain conditions, and a screen retaining element overlying said shaft normally engaging the free edge of one screen to maintain the other screen in position in said canal.

3. In an irrigation canal fish screen structure, a revoluble shaft mounted transversely of the canal, diametrically oppositely directed screen structures mounted upon said shaft adapted to alternately position in said canal, and diametrically oppositely directed paddle arms carried by said shaft at right angles to said screen structure for causing said shaft to describe a complete half revolution under certain conditions, and a screen retaining element overlying said shaft normally engaging the free edge of one screen to maintain the other screen in position in said canal, said retaining element having vertical swinging movement to permit release of the screen held thereby upon the application of excessive pressure to the lower screen, to permit said screens to describe half revolution.

4. A fish guard for irrigation canals, comprising a reel consisting of a shaft and radially extending screen frames carried thereby, said reel being designed to be pivotally supported between the side walls of irrigation canals, and means for normally maintaining said reel in position with one of said screens in position transversely of the canal, comprising a hinged frame designed to overlie the canal, and cross members carried by said frame one of which is normally in contact with one edge of a screen, substantially as and for the purpose described.

5. A fish guard for irrigation canals, comprising a reel consisting of a shaft and radially extending screen frames carried thereby, said reel being designed to be pivotally supported between the side walls of irrigation canals, and means for normally maintaining said reel in position with one of said screens in position transversely of the canal, comprising a hinged frame designed to overlie the canal, cross members carried by said frame one of which is normally in contact with one edge of a screen, and spring members connecting said frame at the free end with the fixed member to normally maintain the frame in screen engaged position.

6. In a fish guard for irrigation canals, a reel comprising a shaft designed to be pivotally mounted transversely of a canal, screen members carried by and extending radially from said shaft, one thereof being normally positioned in and transversely of the canal, a reel restraining frame comprising a pair of side members each having one end pivotally secured to one side wall of the canal and a pair of cross members rotatably mounted between and connecting the free ends of said side members, one of said cross members being designed to retard the revolving movement of the reel and the other thereof being designed to engage a free edge of a screen to stop the revolution of the reel, substantially as and for the purpose described.

7. In a fish guard for irrigation canals, a reel comprising a shaft designed to be pivotally mounted transversely of a canal, screen members carried by and extending radially from said shaft, one thereof being normally positioned in and transversely of the canal, a reel restraining frame comprising a pair of side members each having one end pivotally secured to one side wall of the canal, and a pair of cross members rotatably mounted between and connecting the free ends of said side members, one of said cross members being designed to retard the revolving movement of the reel and the other thereof being designed to engage a free edge of a screen to stop the revolution of the reel, means whereby said side rails are prevented from swinging below a position wherein the last mentioned cross member will be below the free edge of the uppermost one of said screens, and resilient means normally maintaining said frame in down position.

In testimony whereof I affix my signature.

SAMUEL LEWIS ARNOLD.